(12) United States Patent
Lee

(10) Patent No.: US 8,558,870 B2
(45) Date of Patent: Oct. 15, 2013

(54) METHOD OF DISPLAYING IMAGES ON A MOBILE COMMUNICATION TERMINAL

(75) Inventor: Eun Young Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1707 days.

(21) Appl. No.: 11/845,734

(22) Filed: Aug. 27, 2007

(65) Prior Publication Data

US 2008/0225109 A1    Sep. 18, 2008

(30) Foreign Application Priority Data

Mar. 16, 2007  (KR) .................. 10-2007-0026076

(51) Int. Cl.
*H04R 25/00* (2006.01)

(52) U.S. Cl.
USPC ............... 348/14.16; 348/14.07; 348/14.08; 348/14.1; 348/14.15

(58) Field of Classification Search
USPC .......................... 348/14.01–14.16
See application file for complete search history.

(56) References Cited

U.S. PATENT DOCUMENTS

| | | | |
|---|---|---|---|
| 6,805,898 B1* | 10/2004 | Wu et al. ................ | 427/2.25 |
| 6,806,898 B1* | 10/2004 | Toyama et al. ........... | 348/14.16 |
| 8,032,177 B2* | 10/2011 | Kim et al. ............... | 348/14.07 |
| 2003/0112358 A1* | 6/2003 | Hamada ................ | 348/333.12 |

FOREIGN PATENT DOCUMENTS

| | | |
|---|---|---|
| JP | 09-107531 | 4/1997 |
| JP | 2001-177809 | 6/2001 |
| JP | 2003-111040 | 4/2003 |

OTHER PUBLICATIONS

Michael Puccio, "Electrolytic Tilt Sensors and Inclinometers", Sensor Technology and Design, Sep. 2004 http://www.spectronsensors.com/articles/Sensors%20Sept%202004.pdf.*

* cited by examiner

*Primary Examiner* — Davetta W Goins
*Assistant Examiner* — Jasmine Pritchard
(74) *Attorney, Agent, or Firm* — Lee, Hong, Degerman, Kang & Waimey (57) ABSTRACT

A mobile communication terminal displays images of a video conference to enable a feeling of natural conversation ambience to the participants. The terminal captures an image of the terminal user and receives images of other video conference participants. The terminal displays one of the received images closest to the camera, and the captured image farthest from the camera to encourage the user to focus his line of sight to the camera. Also, a sight location indicator is displayed as a further aid to directing the line of sight. Looking at the camera provides a natural conversation ambience to the participants.

17 Claims, 7 Drawing Sheets

METHOD OF DISPLAYING IMAGES ON A MOBILE COMMUNICATION TERMINAL

CROSS-REFERENCE TO RELATED APPLICATIONS

Pursuant to 35 U.S.C. §119(a), this application claims the benefit of earlier filing date and right of priority to Korean Patent Application No. 10-2007-0026076, filed on Mar. 16, 2007, the contents of which are hereby incorporated by reference as if fully set forth herein.

FIELD OF THE INVENTION

The present invention relates to a mobile communication terminal, and more particularly, to a mobile communication terminal and method of displaying an image. Although the present invention is suitable for a wide scope of applications, it is particularly suitable for displaying an image in a mobile communication terminal capable of video communication.

DISCUSSION OF THE RELATED ART

Generally, the technical development of digital cameras has enabled a video communication terminal to be equipped with a camera for use in transmitting images during a video conference. The video communication terminal exchanges images captured by a digital camera with a correspondent communication terminal in a video communication mode. In particular, an image received from a correspondent party is displayed on an LCD window and the user's image, captured by a digital camera, is transmitted to the correspondent party's terminal.

In video communication, it is desirable to make a terminal user feel natural while in conversation with a correspondent party. However, a related art terminal fails to provide a user with a natural feeling in video communication.

SUMMARY OF THE INVENTION

Accordingly, the present invention is directed to a mobile communication terminal and method of displaying an image thereof that substantially obviate one or more problems due to limitations and disadvantages of the related art.

An embodiment of the present invention provides a method of displaying an image in a mobile communication terminal having a normal conversation ambience. A normal conversation ambience can be induced by directing a sight line of the user to the camera by providing a sight location indicator or by positioning an image of one of the correspondent parties adjacent to the camera.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to one embodiment, a method of displaying an image in a mobile communication terminal includes capturing a first image using a camera disposed on the terminal, receiving at least one second image, displaying the first image and the at least one of a second image on a display screen, wherein one of the second images is displayed closest to the camera, and the first image is displayed farthest from the camera; and transmitting the first image.

Additional aspects include receiving and displaying an additional second image wherein the first image is displayed farthest from the camera, displaying a sight location indicator located near the camera wherein the sight location indicator is displayed for a period of time, intermittently, or periodically during the course of a video communication, and changing the size and positions of the displayed first and second images.

In another aspect, a mobile communication terminal capable of video communication includes a camera unit configured to capture a first image, a radio communication unit configured to transmit the first image and to receive at least one second image, a display unit configured to display the first image and the at least one second image, and a control unit controlling a display position of the first image and the display position of at least one of the second images, wherein one of the second images is displayed closest to the camera, and the first image is displayed farthest from the camera.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

DETAILED DESCRIPTION OF THE INVENTION

Reference will now be made in detail to the embodiments of the present invention, examples of which are illustrated in the accompanying drawings. Wherever possible, the same reference numbers will be used throughout the drawings to refer to the same or like parts.

A mobile communication terminal described in the specification can include a portable electronic device including a mobile phone, a digital broadcast terminal, an MP3 player, a personal digital assistant (PDA), a portable multimedia player (PMP), or a navigation terminal.

Figure 1:
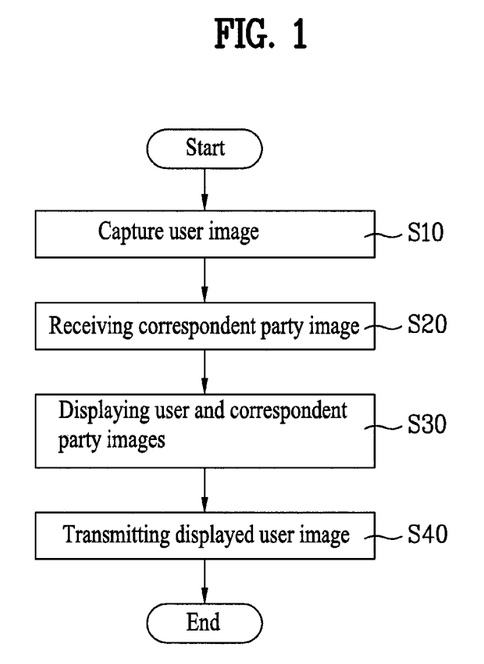
FIG. 1 shows a method of displaying an image in a mobile communication terminal according to one embodiment of the present invention.
Figure 2:
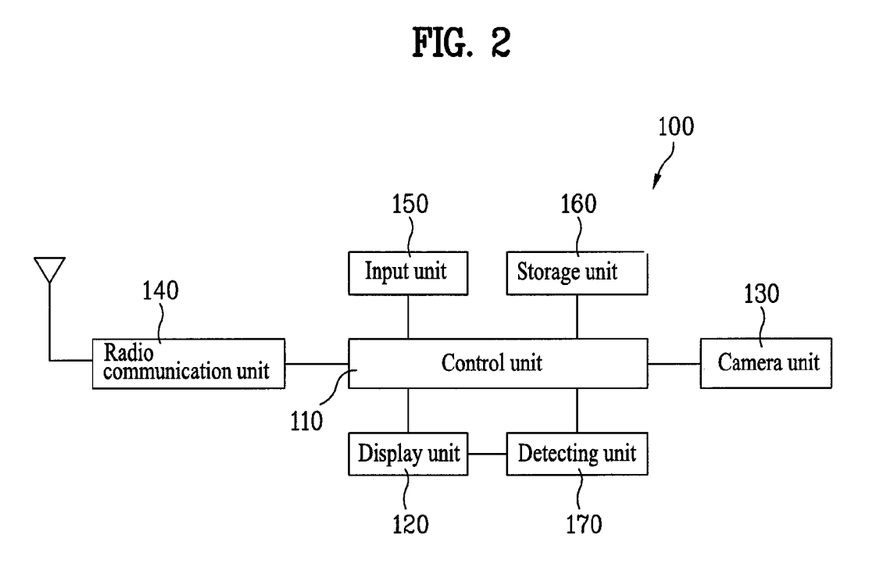
FIG. 2 is a block diagram of a mobile communication terminal according to one embodiment of the present invention.

FIG. 1 is a flowchart of a method of displaying an image in a terminal according to one embodiment of the present invention, and FIG. 2 is a block diagram of a terminal according to one embodiment of the present invention.

A terminal 100 of the present invention shown in FIG. 2 includes a control unit 110, a display unit 120, a camera unit 130, a radio communication unit 140, an input unit 150, a storage unit 160, and a detecting unit 170.

The mobile communication terminal 100 shown in FIG. 2 is just one embodiment of the present invention and does limit the present invention. Elements of the present invention shown in FIG. 2 may be omitted in part, or new elements may be added according to implementation.

Referring to FIGS. 1 and 2, a terminal captures the user's image (captured image) for a video communication (S10). This is accomplished using the camera unit 130 which may be located at various positions on the terminal 100 according to the terminal type.

An image of the correspondent party to the video communication is received (received image) (S20). A plurality of correspondent party images can be received when in a multi-party communication. In a one-to-one video communication, there is one received image. In a multi-user video communication or conference, there can be a plurality of received party images. Functions S10 and S20 may be performed in reverse order. The number of received images may vary during the video communication. For instance, a correspondent party may join or drop from the video communication. Image reception is accomplished by the radio communicating unit 140.

The captured image and at least one received image are displayed on the display unit 120 (S30). The control unit 110 displays the received image closer to the camera unit 130 than the captured image. Function S30 can be executed during the initiation of the video communication, and may be executed as default when initiating the video communication.

According to one embodiment of the present invention, an arrangement of a received image and a captured image is related to the position of the camera unit 130 on the terminal. FIGS. 3(a) to (c) and FIGS. 4(a) to (c) show different arrangements for the received and captured images for different camera positions.

Figure 3A:
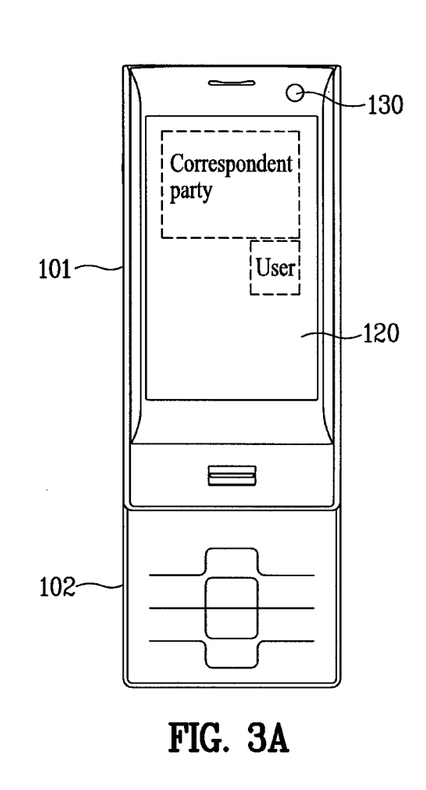
FIGS. 3(a) to 3(c) are state diagrams for the image displaying method of FIG. 1, showing different states according to the position of a camera unit on the terminal.

If the camera unit 130 for video communication is placed at a right upper part of a slide unit 101, the received image is displayed on a right upper part of a screen in the vicinity of the camera unit 130 as shown in FIG. 3(a). For convenience of explanation, in a slide-type terminal, the upper slide housing is a slide unit 101 and the lower housing is a body unit 102.

Figure 3B:
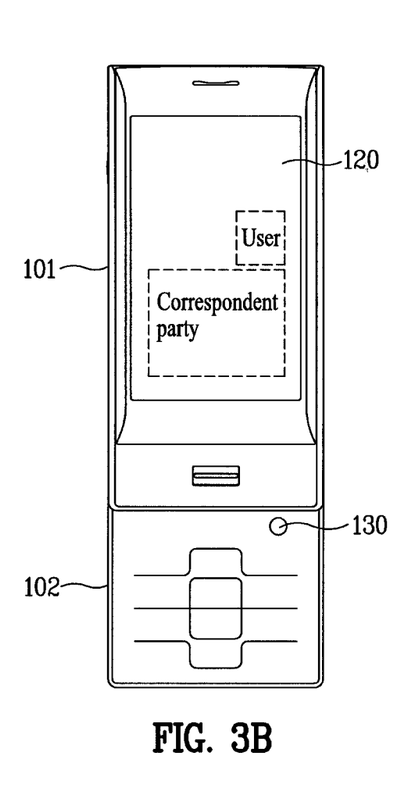

When the camera unit 130 is placed at a right upper part of the body unit 102, the received image can be displayed on a lower part of a screen adjacent to the camera unit 130 as shown in FIG. 3(b).

Figure 3C:
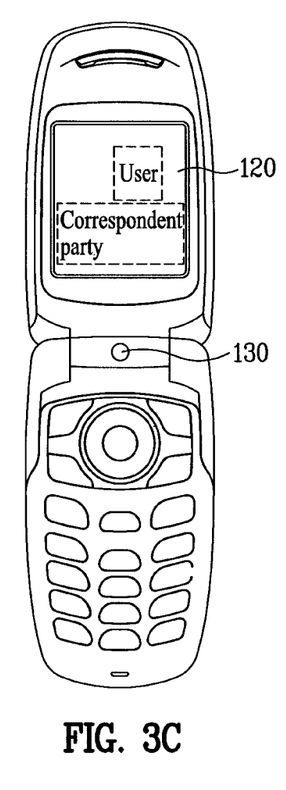

In FIG. 3(c), the camera unit 130 is located at a center of a folder type terminal, and a received image is displayed on a lower part of a screen adjacent to the camera unit 130.

Figure 4A:
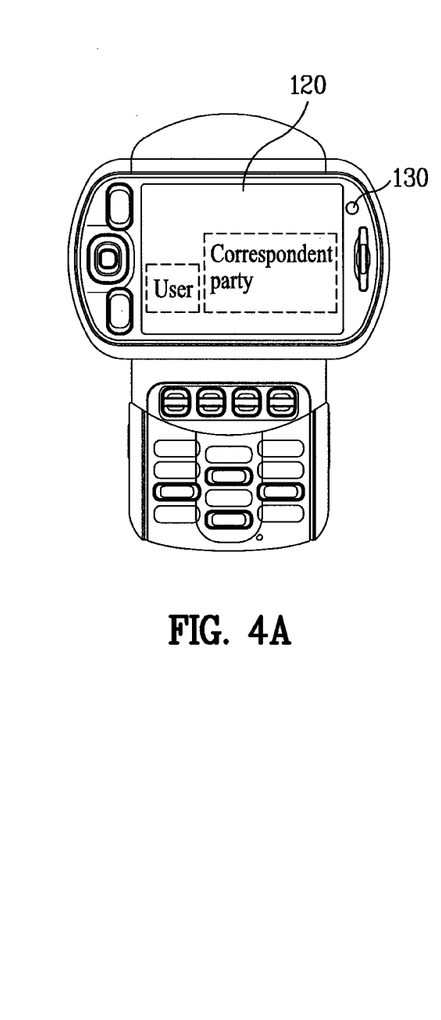
FIGS. 4(a) to 4(c) are state diagrams for the image displaying method of FIG. 1, showing different states according to the position of a camera unit on the terminal.
Figure 4B:
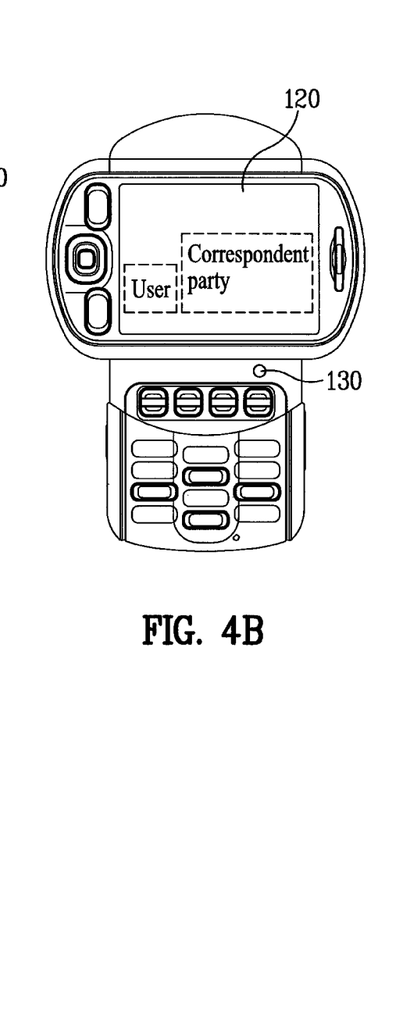
Figure 4C:
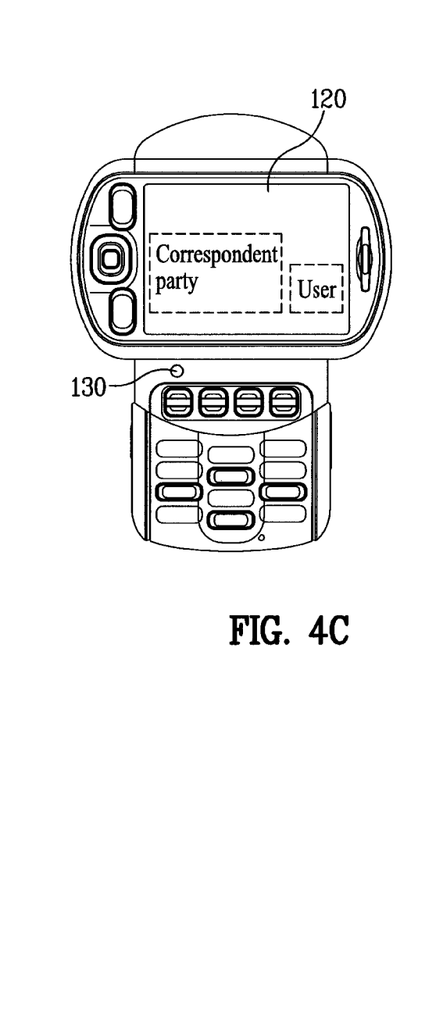

FIGS. 4(a) to (c) show the displayed images when the display unit 120 is rotated in a horizontal direction. Similar to FIGS. 3(a) to 3(c), FIGS. 4(a) to (c) indicate that a received image is displayed adjacent to the camera unit 130.

According to one embodiment of the present invention, the display unit 120 can include a first display unit and a second display unit to display a captured image and a received image, respectively.

Figure 5:
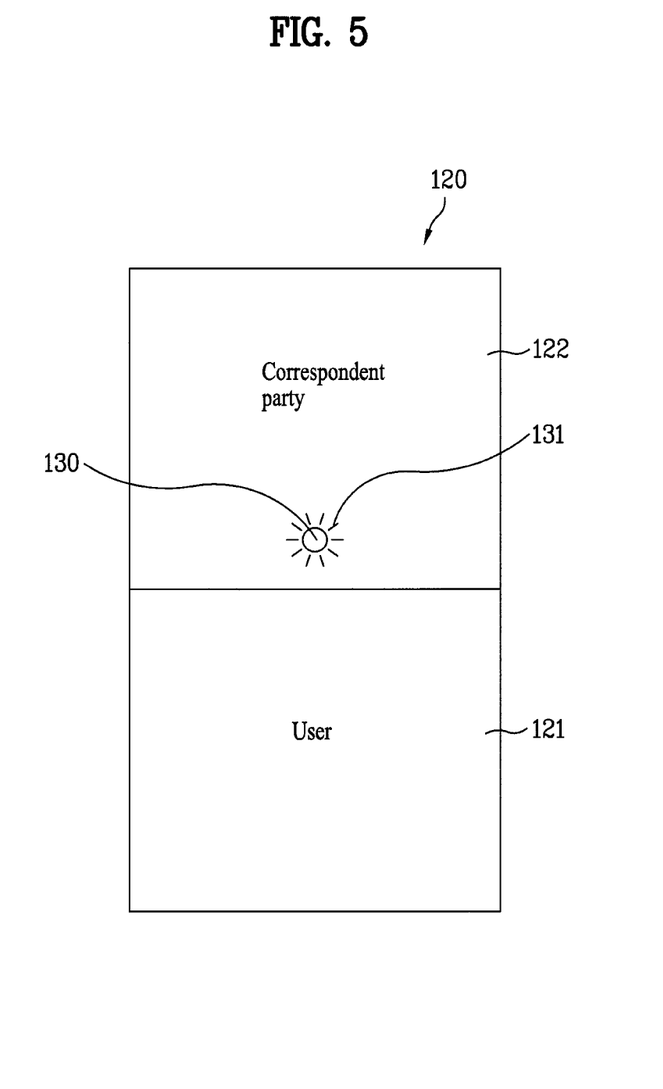
FIG. 5 shows a display unit of a mobile communication terminal having a dual display according to one embodiment of the present invention.

FIG. 5 shows a display unit of a terminal having a dual display according to one embodiment of the present invention, a display unit 120 can be divided into a first display unit 121 and a second display unit 122. The captured image is displayed on the first display unit 121 and a received image can be displayed on the second display unit 122.

Moreover, a terminal according to one embodiment of the present invention can be provided with a sight location indicator. The sight location indicator is a display to which a user is induced to focus his eyes when engaging in video communication. The light 131 is an example of the sight location indicator. The light 131 can be displayed at a position in the vicinity of a camera unit 130.

The light 131 may be displayed for duration of the video communication. The light 131 can be intermittently displayed or can be periodically displayed during the communication. The light 131 can be located in the vicinity of a camera on any terminal according to an embodiment of the present invention as well as the camera of the terminal shown in FIG. 5. The sight location indicator may be implemented in various forms including a lighted circumference of the camera unit 130 that can be made to flicker.

FIGS. 6(a) to (d) are state diagrams for the image displaying method shown in FIG. 1, in which a terminal displays a plurality of received images.

One of the plurality of received images can be displayed closest to the camera unit 130.

Figure 6A:
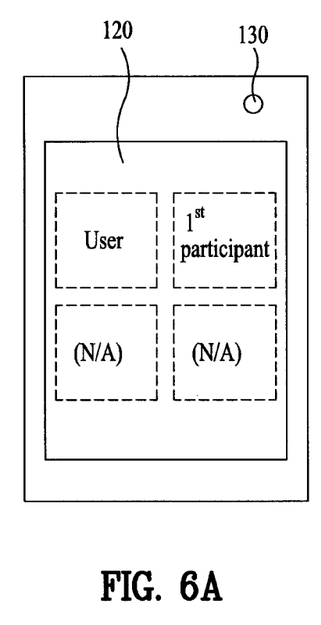
FIGS. 6(a) to 6(d) shows state diagrams for the image displaying method of FIG. 1, showing different states according to the number of participants in a video communication.

Two participants, including a terminal user, join a video communication as shown in FIG. 6(a). The received image is displayed on a right upper part of a screen adjacent to the camera unit 130 and the captured user image is displayed to the left of the received image.

Figure 6B:
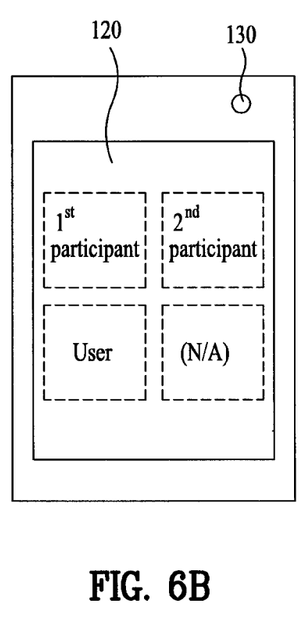

In FIG. 6(b), a three participant conference is shown. In this case, the second received image is displayed on the upper right portion of a screen closest to a location of a camera unit 130, and the first received image is displayed to the left of the second received image. The captured image is displayed in the lower left portion of the screen farthest from the camera unit 130.

Figure 6C:
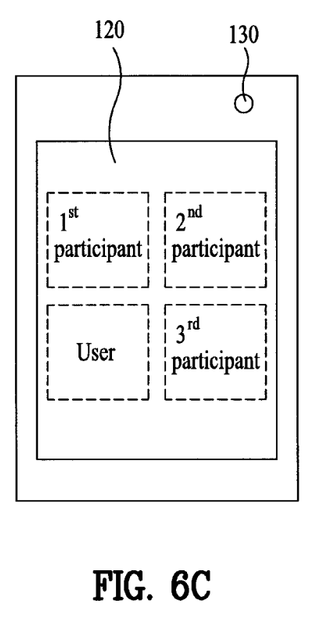
Figure 6D:
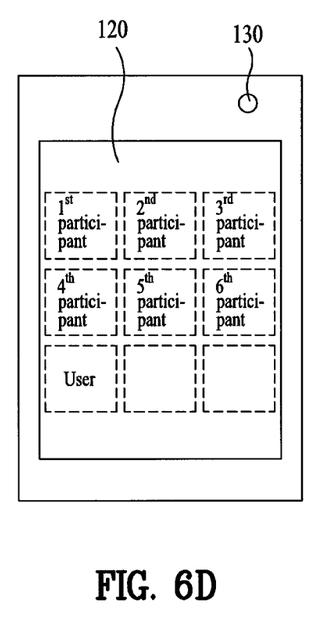

FIGS. 6(c) and 6(d) show video communications having four and seven participants respectively. First, the captured image is displayed in the left most position of the bottom row of displayed images. The left most position of the bottom row is the display position farthest from the camera unit 130. Received images are displayed in the leftmost available position of the top row, and when the top row is filled in the leftmost available position of the next row.

In FIG. 6(c), the display is divided into two rows having two positions each for a four participant video communication. FIG. 6(d) shows a seven participant communication in which the display is divided into three rows, each row having three positions.

The examples shown in FIGS. 6(b) to (d) are applicable to a multi-user videoconference. If a plurality of images is displayed, the captured image can be displayed in the farthest position from the camera unit 130 in various ways. For instance, an image of the video conference host or an image of the person having the right to speak can be displayed closest to the camera unit 130. Also, the received images can be displayed in order of their video communication connections, the first received image being displayed closest to the camera unit 130.

Figure 7A:
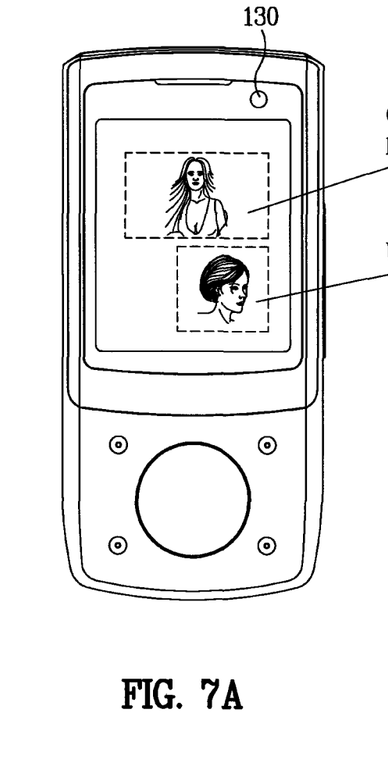
FIGS. 7(a) to 7(b) are state diagrams for the image displaying method of FIG. 1, showing that the size of a displayed image varies in the course of video communication.
Figure 7B:
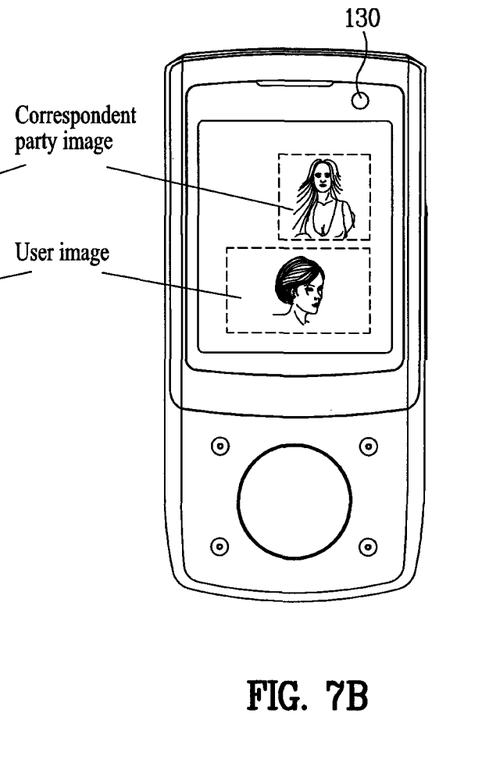

FIGS. 7(a) and 7(b) show one embodiment in which the size varies of a displayed image. For example, FIG. 7(a) shows a received image displayed larger than the captured image. FIG. 7(b) shows the captured image displayed larger than the received image. Thus, the present invention enables an image size to be adjustable, thereby diversifying image representation.

Also, according to one embodiment of the present invention, the position of a displayed image may be changed. For example, the input unit 150 may be a touch screen. The position of one of the displayed first and second images may be adjusted by dragging the image responsive to user contact with the touch screen.

A terminal according to one embodiment of the present invention can be further provided with a detecting unit 170 that detects a rotation of a display unit 120. If a rotation of the display unit 120 is detected, the terminal is able to change a display orientation of the screen as a result of the detected rotation.

Figures 8A, 8B:
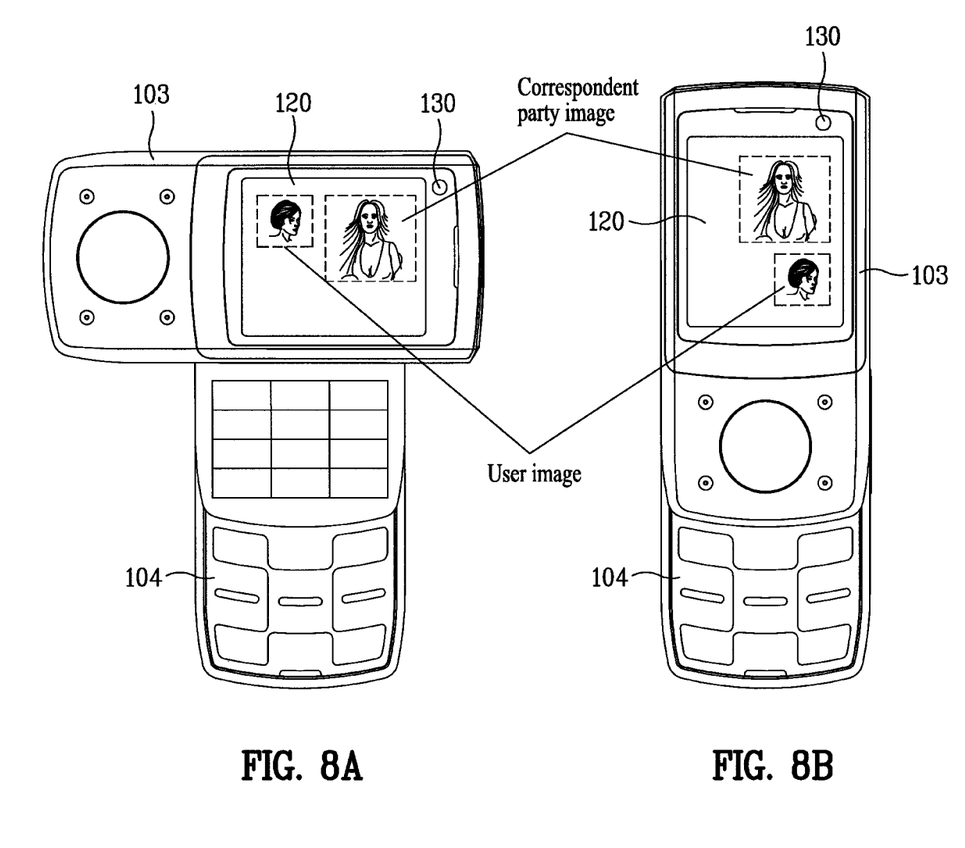
FIGS. 8(a) and 8(b) are state diagrams for the image displaying method of FIG. 1, showing position of the images when a terminal display is rotated during a video communication.

FIGS. 8(a) and (b) shows the image displaying according to the method of FIG. 1, wherein the displayed images are oriented according to the rotation of the display. FIG. 8(a), shows the images displayed on a horizontal screen, and FIG. 8(b) shows the images displayed on a vertical screen.

The detecting unit 170 may be, for example, a gyro-sensor using movement of a rotational object, or an inclinometer using gravity. The detecting unit 170 detects a rotation of a rotation body 103 with respect to a main body 104. The rotation body 103 includes the display unit 120. If the received image is displayed in a position adjacent to the camera unit 130, the terminal user's line-of-sight will be directed to the camera unit 130. Therefore, participants in the video communication enjoy the feeling of having a natural conversation directly with each other.

Returning to FIG. 1, the captured image may be transmitted to the correspondent party (S40). If a terminal of the correspondent party displays the transmitted image in a like manner, the correspondent party can also have a natural conversation.

In this case, the corresponding transmission can be carried out through key manipulation. The input unit 150 can include one of a keypad, a touch pad, and a touch screen according to an implementation of the terminal 100. In particular, if the input unit 150 includes the touch screen, a key signal can be provided by touching a displayed image of the display unit 120.

In addition, the video communication or the displayed images can be stored in the storage unit 160.

Accordingly, the present invention can provide a natural conversation ambience by directing a user's line-of-sight to a received image located adjacent to a camera of a mobile communication terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of displaying images on a mobile terminal, the method comprising:
displaying a sight location indicator on a display screen of the mobile terminal, the sight location indicator being in proximity of a camera located on the mobile terminal, wherein the sight location indicator is displayed for a time period related to initiation of a video communication;
capturing a first image of a first user using the camera;
receiving a second image of a second user via a remote device;
displaying the first image and the second image on the display screen of the mobile terminal;
positioning the first image farther from the camera than the second image;
receiving at least one additional image from at least one additional user;
displaying the at least one additional image on the display screen, wherein the first image is displayed farther from the camera than both the second image and the at least one additional image; and
intermittently displaying the sight location indicator during a course of the video communication.

2. The method of claim 1, further comprising enabling a size of the first image and a size of the second image to be adjustable.

3. The method of claim 1, further comprising enabling a displayed position of the second image and a displayed position of the first image to be adjustable.

4. The method of claim 1, further comprising enabling the displayed second image or the displayed first image to be dragged from a first position on the display screen to a second position on the display screen.

5. The method of claim 1, wherein the sight location indicator is displayed periodically during the video communication.

6. The method of claim 1, further comprising displaying the first and the second image in response to the initiation of the video communication.

7. The method of claim 1 further comprising transmitting the first image.

8. The method of claim 1, wherein the first image and the second image are displayed at the initiation of the video communication.

9. A mobile terminal comprising:
a camera configured to capture a first image of a first user using the camera;
a radio transceiver configured to transmit the first image and to receive a second image of a second user received via a remote device;
a controller operatively coupled to a display of the mobile terminal, the controller configured to:
control the display to display the first image and the second image on a display screen of the mobile terminal;
control the display to display a sight location indicator on the display screen of the mobile terminal, the sight location indicator being in proximity of the camera located on the mobile terminal;
control the display to display the first image farther from the camera than the second image; and
control the display to display at least one additional image on the display screen in response to receiving the at least one additional image of at least one additional user via a remote device, wherein the first image is displayed father from the camera than both the second image and the at least one additional image,
wherein the sight location indicator is displayed for a time period related to initiation of a video communication and the sight location indicator is displayed intermittently during a course of the video communication.

10. The mobile terminal of claim 9, wherein the controller is further configured to control the display adjust a position of the sight location indicator.

11. The mobile terminal of claim 9, wherein the display comprises:
  a first display; and
  a second display,
  wherein the first image is displayed on the first display and the second image is displayed on the second display, and
  wherein the camera is located on the second display.

12. The mobile terminal of claim 9, wherein the controller is further configured to:
  detect a rotation of the display; and
  change an orientation of the displayed first image and the displayed second image responsive to the detected rotation of the display.

13. The mobile terminal of claim 12, wherein the controller is further configured to detect rotation of the display with respect to the mobile terminal.

14. The mobile terminal of claim 12, wherein the controller comprises at least a gyro-sensor or an inclinometer.

15. The method of claim 1, wherein the first image and the second image are displayed next to each other on the display screen.

16. The method of claim 1, wherein the first image and the second image are displayed as the same size.

17. The method of claim 2, wherein the first image and the second image are proportionally scaled if adjusted.

* * * * *